(12) United States Patent
Skinner

(10) Patent No.: US 9,912,264 B2
(45) Date of Patent: Mar. 6, 2018

(54) SYSTEM AND METHOD FOR LIMITING VIBRATION OF ELECTRIC MOTOR

(71) Applicant: Nidec Motor Corporation, St. Louis, MO (US)

(72) Inventor: James L. Skinner, Collinsville, IL (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 15/199,376

(22) Filed: Jun. 30, 2016

(65) Prior Publication Data

US 2017/0019039 A1    Jan. 19, 2017

Related U.S. Application Data

(60) Provisional application No. 62/191,948, filed on Jul. 13, 2015, provisional application No. 62/247,618, filed on Oct. 28, 2015.

(51) Int. Cl.
| | |
|---|---|
| *G05B 5/00* | (2006.01) |
| *G06F 11/30* | (2006.01) |
| *H02P 6/08* | (2016.01) |
| *H02P 29/024* | (2016.01) |
| *H02P 6/10* | (2006.01) |
| *H02P 29/032* | (2016.01) |
| *F16C 19/52* | (2006.01) |

(52) U.S. Cl.
CPC ............... *H02P 6/08* (2013.01); *H02P 6/10* (2013.01); *H02P 29/024* (2013.01); *H02P 29/032* (2016.02); *F16C 19/52* (2013.01)

(58) Field of Classification Search
None
See application file for complete search history.

(56) References Cited

U.S. PATENT DOCUMENTS 6,434,512 B1 *  8/2002  Discenzo ............... F16C 19/52
                                              702/184
8,575,873 B2 * 11/2013  Peterson ................ H02P 27/04
                                              318/400.11

\* cited by examiner

*Primary Examiner* — Bentsu Ro
*Assistant Examiner* — Zemenay Truneh
(74) *Attorney, Agent, or Firm* — Hovey Williams LLP

(57) ABSTRACT

A system and method for limiting the vibration of an electric motor so as to avoid situations in which extreme vibration may result in damage to the motor or other equipment. A motor control subsystem runs the motor in accordance with a command specifying a speed or torque. A vibration sensor, such as a three-axis accelerometer, senses a vibration of the electric motor, or, alternatively, software indirectly detects the vibration based on phase or torque ripple. Such vibration may be caused by, e.g., a broken fan blade or an accumulation of snow or ice. A control element receives data regarding the vibration, determines whether the vibration exceeds a pre-determined limit, and if so, takes action to reduce the vibration of the electric motor below the pre-determined limit. Such action may involve slowing or stopping the motor, thereby avoiding damage, increasing reliability, and reducing cost.

17 Claims, 3 Drawing Sheets

US 9,912,264 B2

SYSTEM AND METHOD FOR LIMITING VIBRATION OF ELECTRIC MOTOR

RELATED APPLICATIONS

The present U.S. non-provisional patent application is related to and claims priority benefit of a first earlier-filed U.S. provisional patent application having the same title, Ser. No. 62/191,948, filed Jul. 13, 2015, and of a second earlier-filed U.S. provisional patent application having the same title, Ser. No. 62/247,618, filed Oct. 28, 2015. The entire contents of the identified earlier-filed applications are hereby incorporated by reference into the present application as if fully set forth herein.

FIELD

The present invention relates to systems and methods for controlling the operation of electric motors, and, more particularly, to a system and method for sensing or otherwise detecting and limiting the vibration of an electric motor.

BACKGROUND

Electric motors may experience vibration for various reasons, such as damage to the loads being driven by the motors (e.g., damage to or loss of fan blades) or accumulation of material (e.g., snow or ice) on the loads. Motors and motor mounts are designed to withstand some such vibration, but extreme vibration can cause motor mounts to fail or motors to otherwise dislodge and fall onto or otherwise physically contact pipes, electronics, or other items located underneath or otherwise near the motor. This can cause extensive and/or expensive damage to the items as well as to the motors themselves. Attempts to avoid such results include making the motor mounts stronger, but this solution is costly and has limited effectiveness, and extreme imbalance can still cause equipment damage.

This background discussion is intended to provide information related to the present invention which is not necessarily prior art.

SUMMARY

Embodiments of the present invention solve the above-described and other problems and limitations by providing a system and method for sensing or otherwise detecting and limiting the vibration of an electric motor so as to avoid situations in which extreme vibration may result in damage to the electric motor or other equipment.

In a first embodiment of the present invention, an electric motor system may broadly comprise an electric motor having a shaft configured to drive a load, a motor control subsystem, a vibration sensor, an electronic control element, and an electronic memory element. The motor control subsystem may be configured to control operation of the electric motor, including running the electric motor in accordance with a command specifying a speed or torque at which the electric motor is to be run. The vibration sensor may be configured to sense a magnitude or other characteristic of a vibration of the electric motor. The control element may be configured to receive data from the vibration sensor regarding the characteristic of the vibration, determine whether the characteristic of the vibration exceeds a pre-determined limit, and if so, reduce the speed of the electric motor to reduce the vibration of the electric motor below the pre-determined limit. The memory element may be configured to store the pre-determined limit used by the control element. In one implementation, the vibration sensor may be a three-axis accelerometer, wherein vibrations are sensed as accelerations, and the pre-determined limit may be approximately between one-quarter and one-half g of acceleration, or approximately one-third g of acceleration. In one implementation, the control element may be further configured to electronically communicate a message to a remote location indicating that the characteristic of the vibration exceeded the pre-determined limit and that appropriate action was initiated.

In a second embodiment, the electric motor system may broadly comprise an electric motor having a shaft configured to drive a load, a motor control subsystem, a software component, an electronic control element, and an electronic memory element. The motor control subsystem may be configured to control operation of the electric motor, including running the electric motor in accordance with a command specifying a speed or torque at which the electric motor is to be run. The software component may be configured to indirectly detect a magnitude or other characteristic of the vibration of the electric motor. The control element may be configured to receive data from the software component regarding the characteristic of the vibration, determine whether the characteristic of the vibration exceeds the pre-determined limit, and if so, reduce the speed of the electric motor to reduce the vibration of the electric motor below the pre-determined limit. In one implementation, the software component may determine the characteristic of the vibration based on a phase and/or torque ripple. In one implementation, the control element may be further configured to reverse the reduction in speed after a pre-determined time period, and thereby allow the speed to increase again in accordance with the command. In one implementation, the control element may be further configured to electronically communicate a message to a remote location indicating that the characteristic of the vibration exceeded the pre-determined limit and that appropriate action was initiated.

In a third embodiment, the present invention may be a method for limiting a vibration of an electric motor, wherein the electric motor has a shaft configured to drive a load. The electric motor may be controlled by, e.g., a motor control subsystem, in accordance with a command specifying the speed or torque at which the electric motor is to be run. A magnitude or other characteristic of a vibration of the electric motor may be sensed or detected by, e.g., a vibration sensor or software component. Whether the characteristic of the vibration exceeds the pre-determined limit may be determined, and if the characteristic of the vibration exceeds the pre-determined limit, appropriate action may be initiated by, e.g., an electronic control element, to reduce the characteristic of the vibration below the pre-determined limit. In one implementation, the method may further include the step of reversing the action after a pre-determined time period, and thereby allowing the speed to increase again in accordance with the command. In one implementation, the method may further include electronically communicating to a remote location a message indicating that the characteristic of the vibration exceeded the pre-determined limit and that appropriate action was initiated.

Various implementations of each of the foregoing embodiments and/or characterizations may include any one or more of the following additional features. The electric motor may be a variable speed, three-phase, multi-pole alternating current motor. The load may be, e.g., a fan, a pump, a blower, a rotating drum, a component of a clothes washer or clothes dryer, a component of an oven, a component of a heating and air-conditioning unit, or a component of a residential or commercial machine. The electronic control element may indirectly control the speed of the electric motor by controlling a torque of the electric motor.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
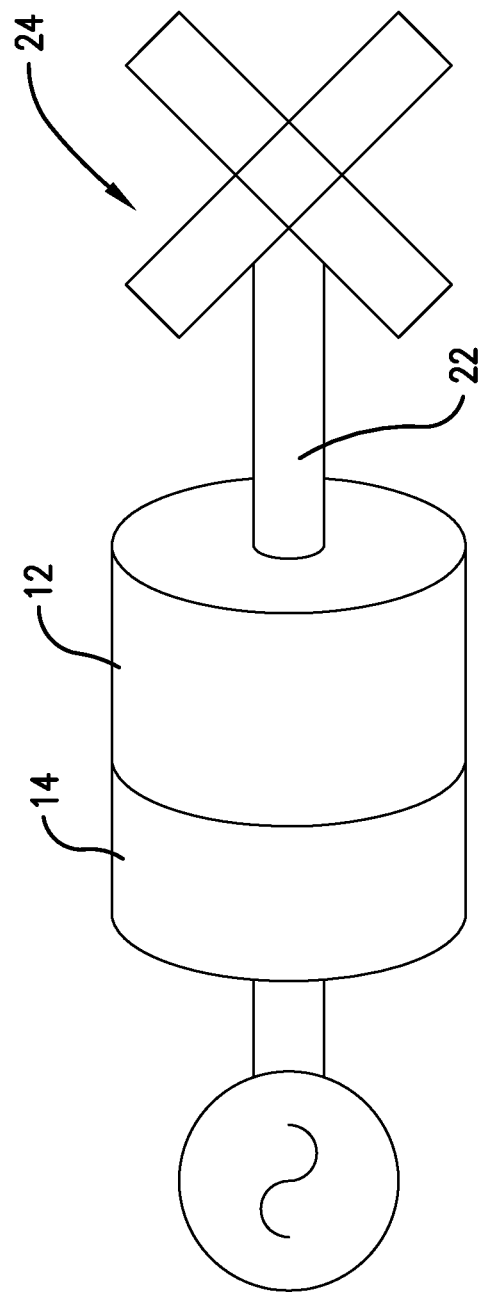
FIG. 1 is a perspective view of an exemplary electric motor.
Figure 2:
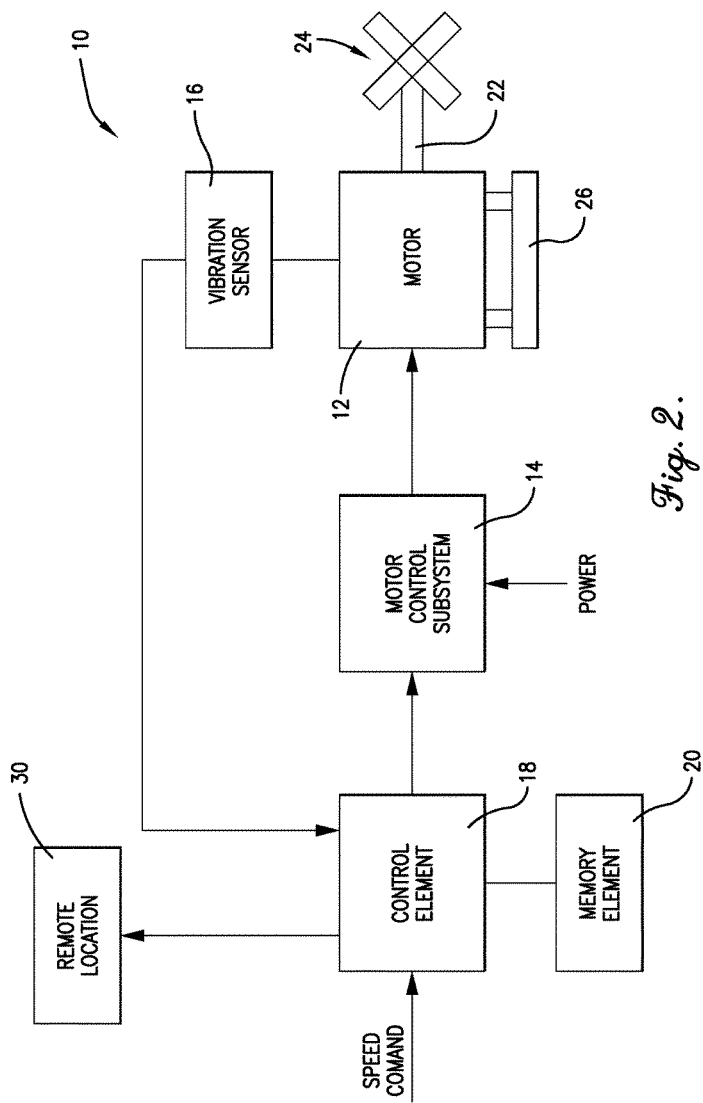
FIG. 2 is a schematic diagram of an embodiment of an electric motor system of the present invention for controlling the operation of an electric motor, such as the electric motor of FIG. 1.

Broadly characterized, the present invention provides a system and method for sensing or otherwise detecting and limiting the vibration of an electric motor so as to avoid situations in which extreme vibration may result in damage to the electric motor or other equipment. Referring to the figures, an embodiment of an electric motor system 10 is shown. Referring to FIGS. 1 and 2, the electric motor system 10 may broadly include the electric motor 12; a motor control subsystem 14; a vibration sensor 16; an electronic control element 18; and an electronic memory element 20.

The electric motor 12 may be a variable speed electric motor. For example, the electric motor 14 may be a three-phase, multi-pole alternating current (AC) permanent magnet or induction motor. The electric motor 12 may include a shaft 22 to facilitate driving any appropriate load 24. For example, the electric motor 12 may drive a fan, a pump, a blower, or a rotating drum, which may be part of a residential or commercial machine, such as a clothes washer or dryer, an oven, or a heating and air-conditioning unit, which may include additional electrical or mechanical components not described herein. The electric motor 12 may be secured in its operating environment by a motor mount 26.

The motor control subsystem 14 may be broadly configured to control operation of the electric motor 12, including during starting and normal operation. In various implementations, the various components of the motor control subsystem 14 may be implemented in hardware and/or software, and may be configured to receive input signals from a user interface and/or one or more sensors and to generate control signals based on such input to control operation of the electric motor 12. In one implementation, the motor control subsystem 14 may receive AC power from an AC power source, and may condition the AC power to drive the electric motor 12 in accordance with a command specifying a speed or torque at which the electric motor 12 is to be run. In one implementation, the motor control subsystem 14 may control the speed of the electric motor 12 by controlling torque (i.e., speed may be indirectly controlled as a function of torque).

The vibration sensor 16 may sense a magnitude or other characteristic of a vibration of the electric motor 12. In one implementation, the vibration sensor may be a three-axis accelerometer, wherein vibrations are sensed as accelerations. In another implementation, the vibration sensor may be a piezoelectric strip or a weighted piezoelectric strip, wherein vibrations are sensed as movements of the strip which produce electric signals. The vibration sensor 16 may be mounted on or near the electric motor 12, the shaft 22, the motor mount 26, or substantially any other location suitable for sensing the vibrations of interest. For example, the vibration sensor 16 may be located on a panel of a cabinet near where or in which the electric motor 12 is located, wherein vibration of the electric motor 12 causes vibration of or otherwise affects the panel. In this example, it may be desirable to avoid running the electric motor 12 at known frequencies that may excite the panel and also cause it to vibrate.

The control element 18 may receive data from the vibration sensor 16 regarding the sensed vibration, determine whether the sensed vibration exceeds a pre-determined limit, and if so, take appropriate action. The control element 18 may be an integral part of the motor control subsystem 14, or may be a separate component.

The pre-determined limit may depend on the design of the system 10 and/or operational needs. For example, the pre-determined limit may be approximately between one-quarter (¼) and one-half (½) g of acceleration, or approximately one-third (⅓) G of acceleration. In one implementation, the appropriate action may involve limiting the command (i.e., slowing the electric motor 12) to reduce the sensed vibrations below the pre-determined limit. In another implementation, the appropriate action may involve stopping the electric motor 12. In one implementation, after a time delay (which may be, e.g., approximately between 1 minute and 1 hour, depending on the context) the speed of the electric motor 12 may be increased again in order to determine whether the vibration reoccurs or whether the cause of the vibration has abated (whether, e.g., the snow or ice causing the load imbalance has melted).

The memory element 20 may be any suitable non-transitory electronic or other memory configured to store data for subsequent access by the control element 18. In particular, the memory element 20 may store the pre-determined limit used by the control element 18 in monitoring the vibration of the electric motor 12.

In another embodiment, the vibration sensor 16 may be replaced with or supplemented by a software component configured to detect the characteristic of the vibration of the electric motor 12. Suitable or adaptable software for this purpose may include existing software used to determine when a washing machine is unbalanced. In one implementation, the software indirectly detects the vibration, the control element 18 determines whether the detected vibration exceeds a pre-determined limit, and if so, takes appropriate action. In one implementation, the vibration may be detected as a phase angle ripple (e.g., as it pertains to rotor position detection). In another implementation, the vibration may be detected as a torque ripple.

In an exemplary implementation, variation in a torque signal ("torque ripple") may be isolated at the mechanical revolution frequency of the shaft 22 of the electric motor 12. The torque ripple of interest may occur once, twice, or at some other integer multiple per mechanical revolution. Filtering (e.g., fast Fourier transform (FFT) or bandpass filtering) or other digital signal processing techniques may be used to eliminate noise and isolate the torque ripple. Such noise may include high frequency noise due to, e.g., pulse width modulation and/or switching, and/or low frequency noise due to, e.g., clogged filters and/or the opening of dampers. Based on the torque ripple caused by the vibration of the electric motor 12, the magnitude of vibration may be determined. The threshold for acceptable torque ripple may depend on the system, the application, and the user's desires and/or needs. It may be desirable to identify exceptions for torque ripple at one or more frequencies or frequency ranges known to result in increased vibration. Further, torque ripple may manifest somewhat differently depending on whether the fan or other load 24 is vertically or horizontally mounted.

Figure 3:
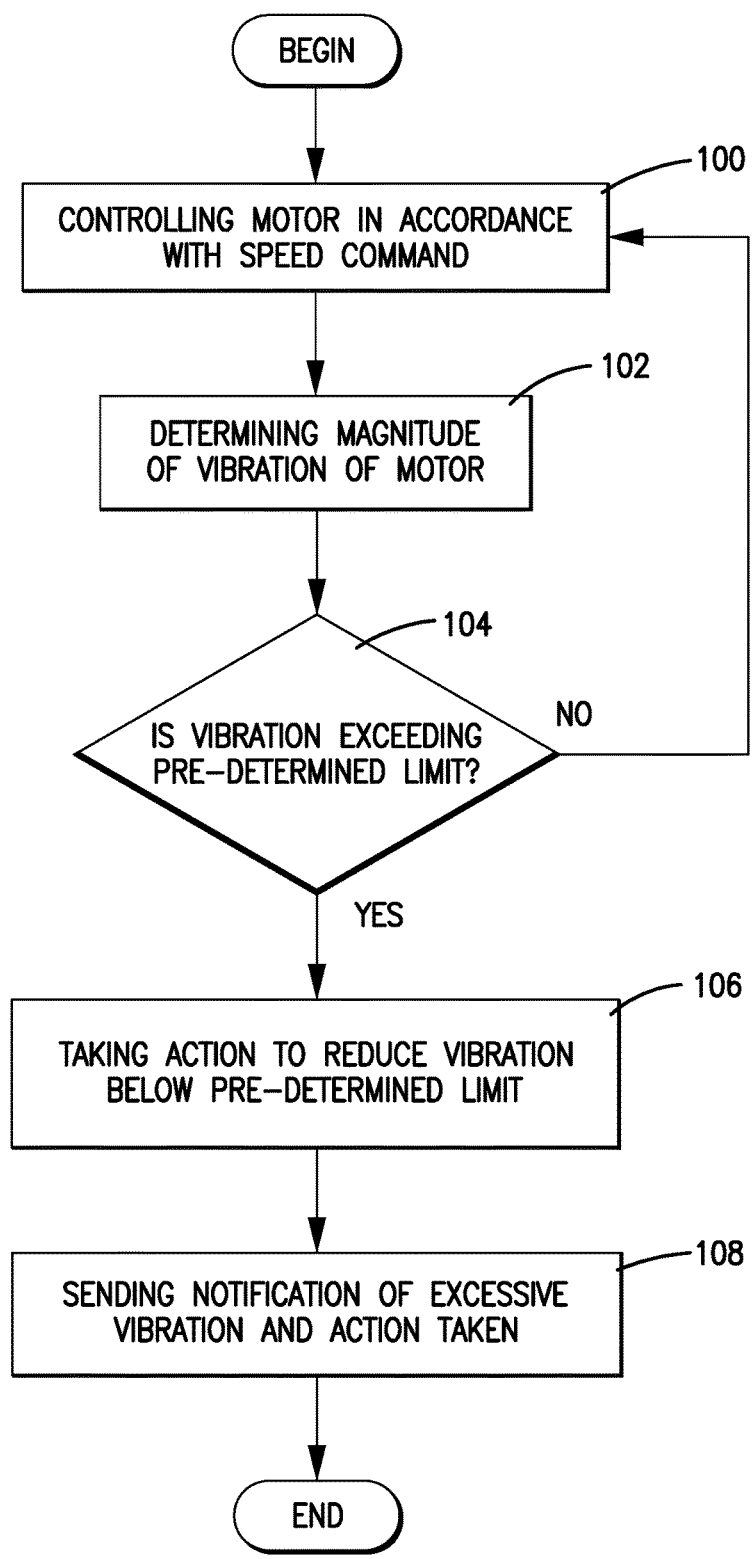
FIG. 3 is a flowchart of steps performed by the electric motor system of FIG. 2.

Referring also to FIG. 3 an embodiment of the electric motor system 10 may function substantially as follows. The motor control subsystem 14 may control the speed or torque of the electric motor 12 in turning the shaft 22 and driving the load 24, as shown in step 100. The characteristic of any vibration associated with such operation of the electric motor 12 may be determined, as shown in step 102. As described, in one implementation, the vibrations may be sensed by the vibration sensor 16 (mounted on or near, e.g., the electric motor 12, the shaft 22, the motor mount 26, or a nearby cabinet panel), while in another implementation, the vibrations may be indirectly detected by software based on, e.g., phase ripple. The control element 18 may determine whether the vibration exceeds the pre-determined limit, as shown in step 104. If the vibration does not exceed the pre-determined limit, then the system 10 may continue to operate in accordance with the speed or torque signal generated by the motor control subsystem 14, as shown in step 100. However, if the vibration does exceed the pre-determined limit, then the control element 18 may take appropriate action to reduce the vibration, as shown in step 106. As described, such appropriate action may include limiting the speed or torque signal to reduce the speed of the electric motor 12 or shutting down the electric motor 12.

In one implementation, the control element 18 may be further configured to cause a message to be communicated to a remote location 30, such as a remote monitoring station or a smart phone or other mobile device, indicating the need to take action and the specific action taken to reduce the vibration, as shown in step 108. Such a message may include, for example, the characteristic of the vibration, the nature of the action (e.g., slow down or shut down), the time the action was initiated, the number of times such action has been initiated in a given time period (e.g., twenty-four hours), and any other useful information (e.g., similar problems with other electric motors in the system, a temperature of the system).

In one implementation, the control element 18 may be further configured to wait for a predetermined time period (which may be, e.g., approximately between 1 minute and 1 hour, depending on the context) and then remove the limit on the speed and thereby allow the speed to increase again in order to determine whether the vibration reoccurs or whether the cause of the vibration has abated (e.g., the snow or ice causing the load imbalance has melted), as shown in step 110.

Thus, the present invention provides substantial advantages over the prior art, including that it limits the vibration of an electric motor so as to avoid situations in which extreme vibration may result in damage to the electric motor or other equipment, thereby increasing reliability and reducing cost.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An electric motor system for limiting a vibration of an electric motor, the electric motor system comprising:
   the electric motor, including a shaft configured to drive a load;
   a motor control subsystem configured to control operation of the electric motor, including running the electric motor in accordance with a command specifying a speed or torque at which the electric motor is to be run;
   a vibration sensor configured to sense a characteristic of a vibration of the electric motor;
   an electronic control element configured to receive data from the vibration sensor regarding the characteristic of the sensed vibration, determine whether the characteristic of the sensed vibration exceeds a pre-determined limit, and if so, automatically start a remedial action of reducing the speed of the electric motor to reduce the vibration of the electric motor below the pre-determined limit, and to automatically stop the remedial action after a pre-determined time period and allow the speed of the electric motor to increase again in accordance with the command; and
   an electronic memory element configured to store the pre-determined limit and the pre-determined time period used by the electronic control element.

2. The electric motor system as set forth in claim 1, wherein the electric motor is a variable speed, three-phase, multi-pole alternating current motor.

3. The electric motor system as set forth in claim 1, wherein the load is selected from the group consisting of: a fan, a pump, a blower, a rotating drum, a component of a clothes washer or clothes dryer, a component of an oven, a component of a heating and air-conditioning unit, and a component of a residential or commercial machine.

4. The electric motor system as set forth in claim 1, wherein the characteristic of the vibration is a magnitude of the vibration.

5. The electric motor system as set forth in claim 1, wherein the vibration sensor is a three-axis accelerometer, the vibration is sensed as an acceleration, and the pre-determined limit is approximately between one-quarter and one-half g of acceleration.

6. The electric motor system as set forth in claim 1, wherein the electronic control element is further configured to electronically communicate a message to a remote location indicating that the characteristic of the vibration exceeded the pre-determined limit and that appropriate action was initiated.

7. The electric motor system as set forth in claim 1, wherein the electronic control element indirectly controls the speed of the electric motor by controlling a torque of the electric motor.

8. An electric motor system for limiting a vibration of an electric motor, the electric motor system comprising:
   the electric motor, including a shaft configured to drive a load;
   a motor control subsystem configured to control operation of the electric motor, including running the electric motor in accordance with a command specifying a speed or torque at which the electric motor is to be run;
   a software component configured to determine a characteristic of a vibration of the electric motor;
   an electronic control element configured to receive data from the software component regarding the characteristic of the vibration, determine whether the characteristic of the vibration exceeds a pre-determined limit, and if so, automatically start a remedial action of reducing the speed of the electric motor to reduce the vibration of the electric motor below the pre-determined limit, and to automatically stop the remedial action after a pre-determined time period and allow the speed of the electric motor to increase again in accordance with the command; and
   an electronic memory element configured to store the pre-determined limit and the pre-determined time period used by the electronic control element.

9. The electric motor system as set forth in claim 8, wherein the load is selected form the group consisting of: a fan, a pump, a blower, a rotating drum, a component of a clothes washer or clothes dryer, a component of an oven, a component of a heating and air-conditioning unit, and a component of a residential or commercial machine.

10. The electric motor system as set forth in claim 8, wherein the characteristic of the vibration is a magnitude of the vibration.

11. The electric motor system as set forth in claim 8, wherein the software component determines the characteristic of the vibration based on a torque ripple isolated at an integer multiple per mechanical revolution of the electric motor.

12. The electric motor system as set forth in claim 8, wherein the electronic control element indirectly controls the speed of the electric motor by controlling a torque of the electric motor.

13. A method for limiting a vibration of an electric motor, wherein the electric motor is a variable speed, three-phase, multi-pole alternating current motor, wherein the electric motor includes a shaft configured to drive a load, and wherein the load is selected form the group consisting of: a fan, a pump, a blower, a rotating drum, a component of a clothes washer or clothes dryer, a component of an oven, a component of a heating and air-conditioning unit, and a component of a residential or commercial machine, the method comprising the steps of:
   controlling the electric motor with an electronic control element in accordance with a command specifying a speed or torque at which the electric motor is to be run;
   determining a characteristic of a vibration of the electric motor;
   determining whether the characteristic of the vibration exceeds a pre-determined limit stored in an electronic memory; and
   if the characteristic of the vibration exceeds the pre-determined limit, automatically starting by the electronic control element a remedial action of reducing the speed of the electric motor to reduce the vibration of the electric motor below the pre-determined limit, and automatically stopping by the electronic control element the remedial action after a pre-determined time period stored in the electronic memory and allow the speed of the electric motor to increase again in accordance with the command.

14. The method as set forth in claim 13, wherein the characteristic of the vibration is a magnitude of the vibration.

15. The method as set forth in claim 13, wherein the step of determining the characteristic of the vibration of the electric motor is accomplished using a vibration sensor which is a three-axis accelerometer, the vibration is sensed as an acceleration, and the pre-determined limit is approximately between one-quarter and one-half g of acceleration.

16. The method as set forth in claim 13, wherein the step of determining the characteristic of the vibration of the electric motor is accomplished using a software component which determines the characteristic of the vibration based on a torque ripple isolated at an integer multiple per mechanical revolution of the electric motor.

17. The method as set forth in claim 13, wherein reducing the speed of the electric motor is indirectly accomplished by reducing by the electronic control element a torque of the electric motor.

* * * * *